(12) United States Patent
Copple et al.

(10) Patent No.: US 6,183,180 B1
(45) Date of Patent: Feb. 6, 2001

(54) WALL NUT AND BOLT ASSEMBLIES

(75) Inventors: Charles M. Copple, Kent; Leonard F. Reid, Bellevue, both of WA (US)

(73) Assignee: Fatigue Technology, Inc., Seattle, WA (US)

( * ) Notice: Under 35 U.S.C. 154(b), the term of this patent shall be extended for 394 days.

(21) Appl. No.: 08/587,710

(22) Filed: Jan. 19, 1996

(51) Int. Cl.$^7$ .................................................. A47G 3/00
(52) U.S. Cl. ........................ 411/107; 411/112; 411/113
(58) Field of Search ............................ 411/111, 112, 113, 411/432, 431, 429, 183

(56) References Cited

U.S. PATENT DOCUMENTS

| | | | |
|---|---|---|---|
| 4,311,319 | * 1/1982 | Snyder et al. | 411/136 |
| 4,576,533 | * 3/1986 | Chartier | 411/431 |
| 4,582,462 | * 4/1986 | Thiel | 411/431 |
| 4,863,327 | * 9/1989 | Poupiter | 411/112 |
| 4,964,594 | * 10/1990 | Webb | 411/431 |
| 5,096,349 | 3/1992 | Landy et al. | 411/108 |
| 5,137,406 | * 8/1992 | Cosenza | 411/183 |
| 5,245,743 | 9/1993 | Landy et al. | 29/523 |
| 5,350,266 | * 9/1994 | Espey et al. | 411/429 |
| 5,380,136 | 1/1995 | Copple et al. | 411/183 |
| 5,405,228 | 4/1995 | Reid et al. | 411/183 |
| 5,468,104 | * 11/1995 | Reid et al. | 411/113 |
| 5,549,432 | * 8/1996 | Raneau | 411/432 |

FOREIGN PATENT DOCUMENTS

933050 * 3/1962 (GB) ...................................... 411/431

* cited by examiner

*Primary Examiner*—B. Dayoan
*Assistant Examiner*—Fredrick Conley
(74) *Attorney, Agent, or Firm*—Delbert J. Barnard

(57) ABSTRACT

A tubular stem (14) at one end of a nut mount (10) is inserted into an opening (O) in a wall (W) and is expanded to connect it to the wall (W). An annular collar or space (16) contacts the wall (W) where it immediately surrounds the opening (O). A clip-on nut (12) is clipped onto a nut receptor (18) that is endwise outwardly of the collar (16). A pushing movement on the clip-on nut (12) moves catch tabs (54, 56) past diametrically opposite edge portions (30, 32) of the nut receptor (18), placing them into positions below the edge portions (30, 32) of the nut receptor (18). When the catches (54, 56) are so positioned, they hold the clip-on nut (12) on the nut receptor (18). The clip-on nut (12) may be a sealed nut. If so, catch tabs (54, 56) are positioned so that when they engage underneath portions of the edge portions (30, 32) of the nut receptor, a seal ring at the base of the clip-on nut (12) is compressed. This compressing of the seal ring (48) causes the clip-on nut to be sealed prior to connection of a bolt to the clip-on nut (12).

33 Claims, 4 Drawing Sheets

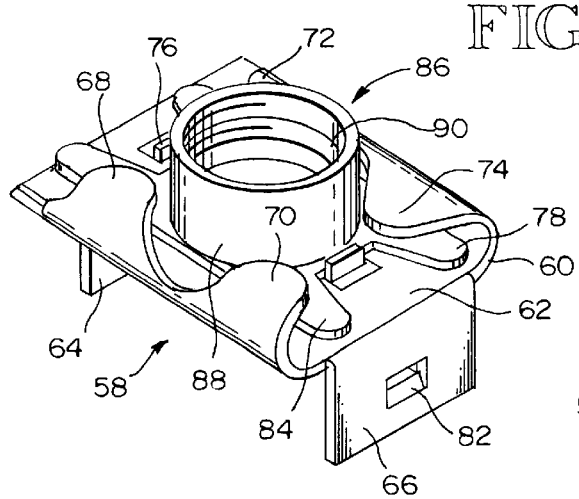
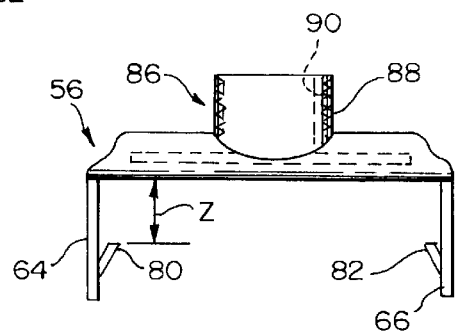
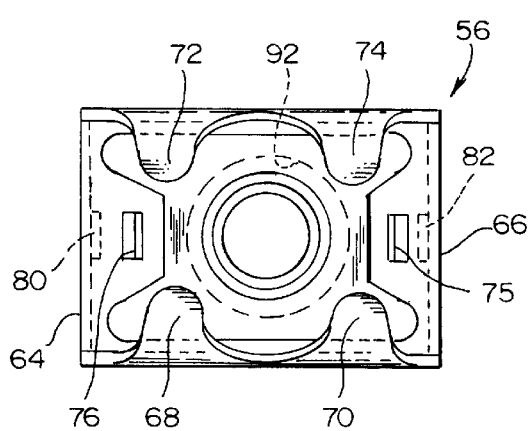
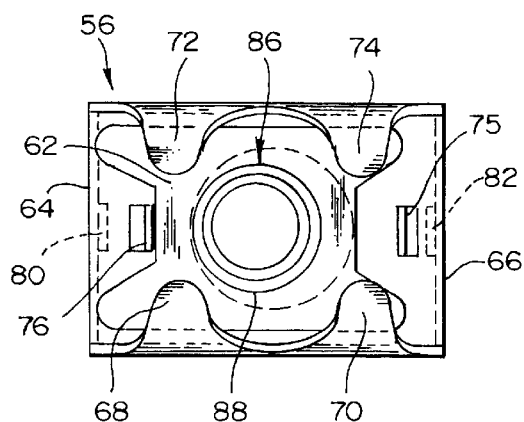
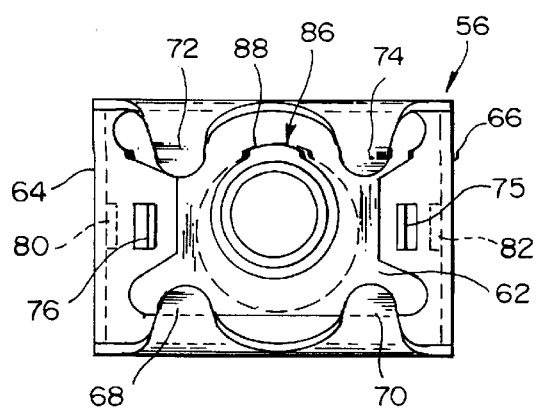

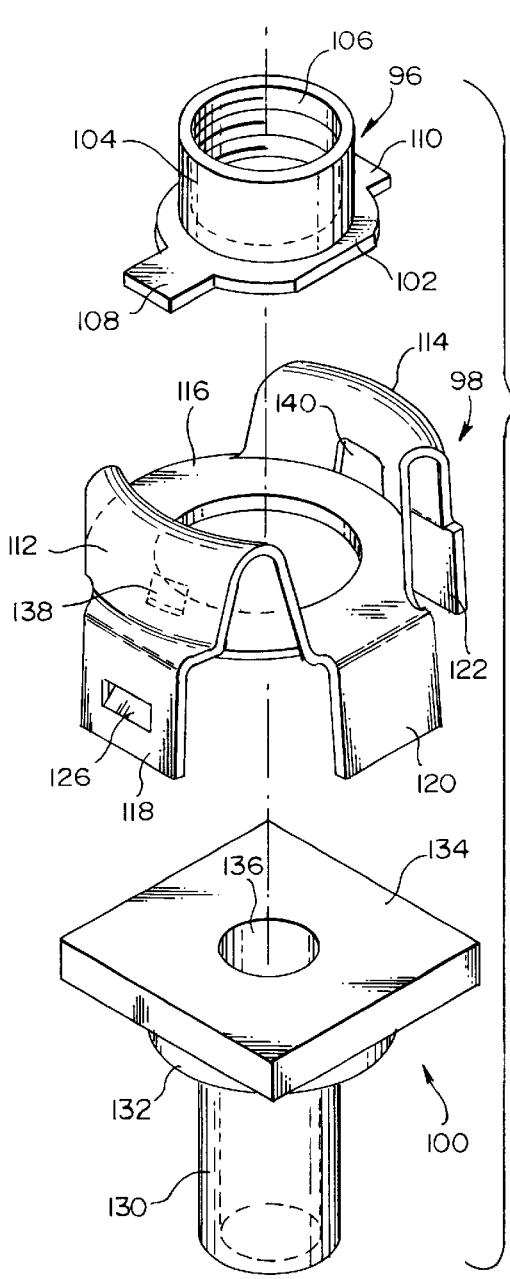
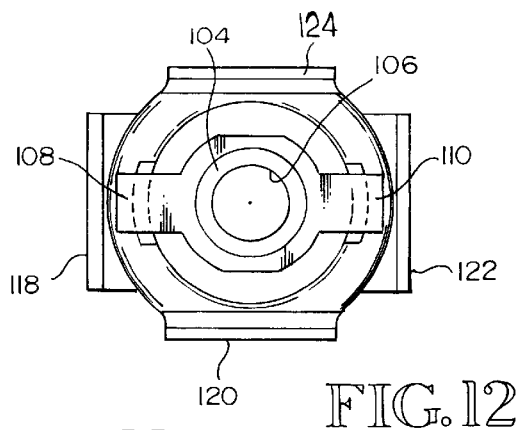
FIG. 11
FIG. 12
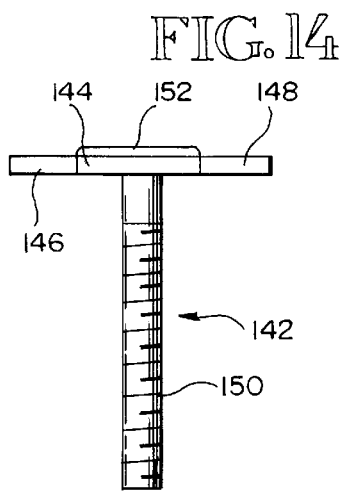
FIG. 14
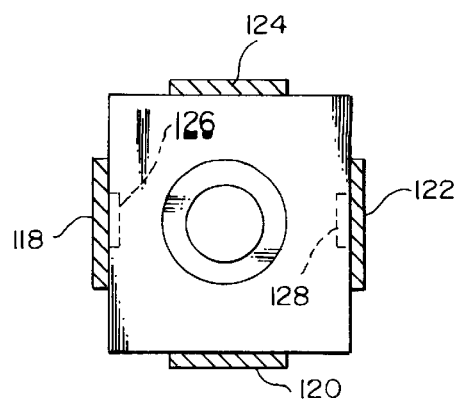
FIG. 13

WALL NUT AND BOLT ASSEMBLIES

TECHNICAL FIELD

The present invention relates to wall nut assemblies composed of a nut and structure for connecting the nut to a wall at the location of a bolt receiving opening in the wall. More particularly, the invention relates to the provision of improved structures for holding the nut and connecting it to the wall, and to the provision of a clip-on nut. The invention also relates to the provision of structures for holding a bolt and connecting it to a wall, and to the provision of a clip-on bolt.

BACKGROUND OF THE INVENTION

The background of what may be termed "the nut plate technology" is discussed in U.S. Pat. No. 5,096,349, granted Mar. 17, 1992, to Michael A. Landy, et. al, in U.S. Pat. No. 5,245,743, granted Sep. 21, 1993 to Michael Landy, et. al, in U.S. Pat. No. 5,380,136, granted Jan. 10, 1995, to Charles M. Copple et. al, in U.S. Pat. No. 5,405,228, granted Apr. 11, 1995, to Leonard F. Reid, et. al, and in U.S. Pat. No. 5,468,104, granted Nov. 21, 1995, to Leonard F. Reid, et. al. These patents disclose nut mounting structures characterized by a tubular stem that fits into an opening in a wall where a bolt is to be located. The tubular stem is radially expanded within the opening to connect the nut mounting structure to the wall. The tooling and methods disclosed in the above patents for expanding the tubular stem are to be considered a part of the present disclosure. Thus, the disclosures of the above-referenced patents are hereby incorporated herein by this specific reference to them.

There is a need for a nut mounting structure that is adapted for easy and quick placement and retention of the nut following connection of the nut mounting structure to the wall. There is also a need for a nut mounting structure for use with a sealed nut that will hold the sealed nut in a sealed position when no bolt is connected to the nut for pulling the nut into a sealed position. It is believed that the wall nut and wall nut mounting structures of this invention will fulfill these needs.

SUMMARY OF THE INVENTION

The nut mounts of this invention are basically characterized by a tubular stem, a collar at one end of the stem, and a nut receptor that is endwise outwardly of the collar. The nut receptor includes a nut receiving base. This base has diametrically opposite edge portions that radially overhang the collar. When the tubular stem is within a circular opening in a wall, and an end surface of the collar is in contact with the wall, about the opening in the wall, the edge portions of the nut receptor overhang the collar and are spaced axially outwardly from the wall.

The wall nut of the present invention is a clip-on nut. It is basically characterized by a nut-element retainer having a base and a pair of side clips that extend axially downwardly from the base at diametrically opposite locations on the retainer. Each side clip includes a radially inwardly projecting catch. The catches are spaced axially from the underneath surface of the nut-element retainer base by a distance substantially equal to the axial dimension of the edge portions of the nut receptor. The clip-on nut further includes a nut-element on the nut-element retainer. The nut-element is secured to the nut-element retainer in a manner that allows it to float in position radially a limited amount. The nut-element retainer, with the nut-element attached to it, are moved axially towards the nut receptor, with the side clips generally aligned with the overhanging edge portions of the base of the nut receptor. The nut-element retainer and the nut-element are then moved axially to place the base of the nut-element retainer onto the base of the nut receptor. Further axial movement of the nut-element retainer against the nut receptor causes the side clips to spread apart until the base of the nut-element retainer is on the nut receptor. At that time, the side clips snap inwardly to place the catches below the overhanging edge portions of the receptor.

In a preferred embodiment, the clip-on nut is a sealed nut. The nut retainer includes a sealed housing that extends axially from the base, in a direction opposite from the side clips. The nut-element is within the sealed housing. The base of the nut retainer includes an annular seal disposed on the underneath side of such base, between the two side clips. When the clip-on nut is installed on the nut mount, the annular seal is compressed, causing it to seal against liquid leakage between the base of the nut receptor of the nut mount and the base of the nut-element retainer of the clip-on nut.

The wall nut assembly of the present invention is also adapted for use with a nut that is not sealed.

According to an aspect of the invention, the end surface of the collar that contacts the wall about the opening in the wall is a convex surface. This enables it to fit tight against either a flat wall surface or a concave wall surface.

According to the invention, the mounting system of the invention can be used to mount the bolt rather than the nut. The bolt is secured to the wall or workpiece and then the nut is added.

Other objects, features and advantages of the invention will be hereinafter described in greater detail, as a part of the description of the best mode and the alternative embodiments of the invention.

BRIEF DESCRIPTION OF THE DRAWINGS

Like reference numerals are used to designate like parts throughout the various figures of the drawing, and:

FIG. 6 is a pictorial view of a second embodiment of the clip-on nut, such view being taken from above and looking towards one side and one end of the clip-on nut;

FIG. 7 is a side elevational view of the clip-on nut shown by FIG. 6;

FIG. 8 is a top plan view of the clip-on nut shown by FIGS. 6 and 7, such view showing the nut-element in a generally centered position;

FIG. 9 is a view like FIG. 8, but showing the nut-element shifted in position endwise of the nut retainer;

FIG. 10 is a view like FIGS. 8 and 9, but showing the nut-element shifted in position sideways relative to the nut-element retainer;

FIG. 11 is a view similar to FIG. 2, but of a modified construction of the several components, such view showing a nut-element, a nut retainer and a nut mount, said nut mount being characterized by a generally square head;

FIG. 12 is a top plan view of the nut-element within the nut retainer;

FIG. 13 is a sectional view of the nut-element and nut retainer on the nut mount, such view being taken at the plane of the top of the nut mount, said top of the nut mount being shown in top plan, and four clips on the nut retainer being shown in cross-section; and FIG. 14 is a side elevational view of a substitute for the nut-element, such substitute being a bolt-element that is held against endwise movement and rotation by the retainer.

BEST MODE FOR CARRYING OUT THE INVENTION

Figure 1:
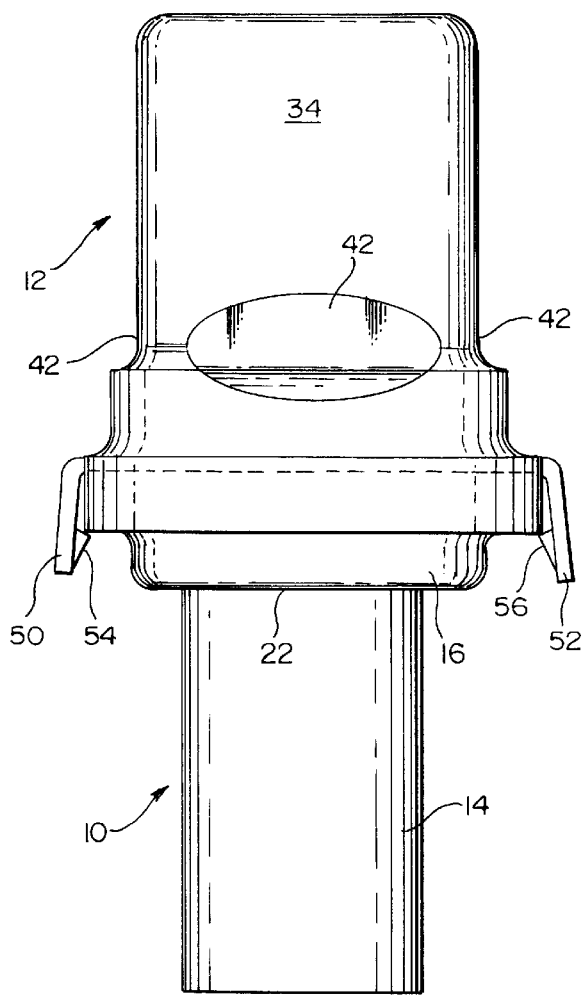
FIG. 1 is a side elevational view of a wall nut assembly constructed according to the present invention.
Figure 2:
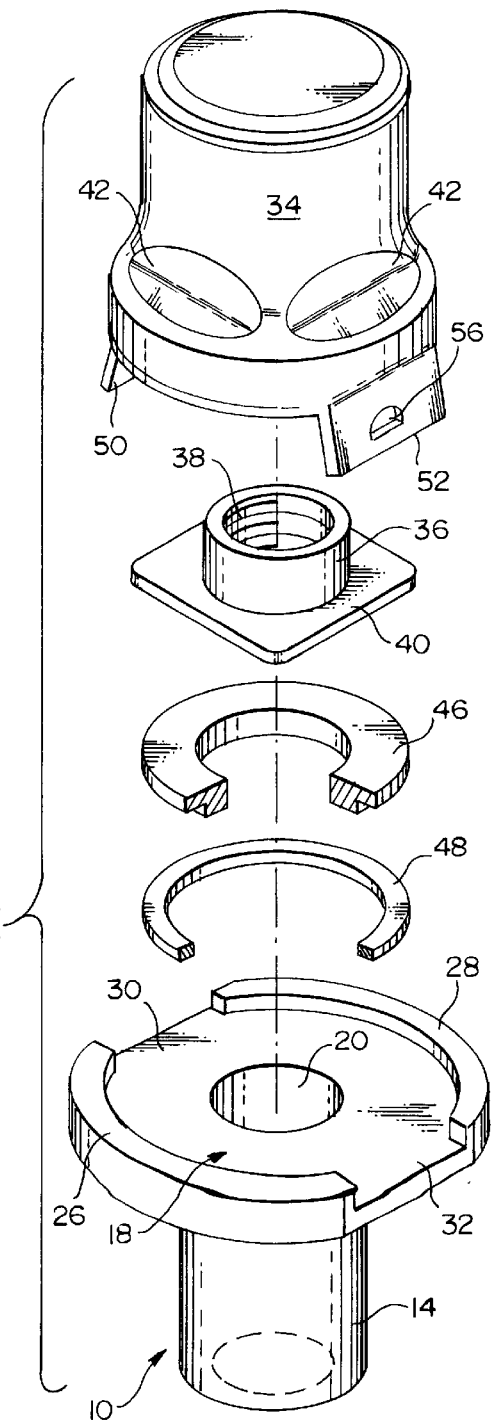
FIG. 2 is an exploded pictorial view of the wall nut assembly shown by FIG. 1, such view being taken from above and looking towards one side of the wall nut assembly, with foreground quarter section portions of the nut-element, the seal ring and a closure wall omitted so as to present axial sectional views of these components.

Referring to FIGS. 1 and 2, in preferred; form, the wall nut assembly of the present invention is composed of two components. The first component is a nut mount 10. The second component is a clip-on nut 12. Nut 12 can also be referred to as a "snap-on" nut.

Figures 3, 4, 5:
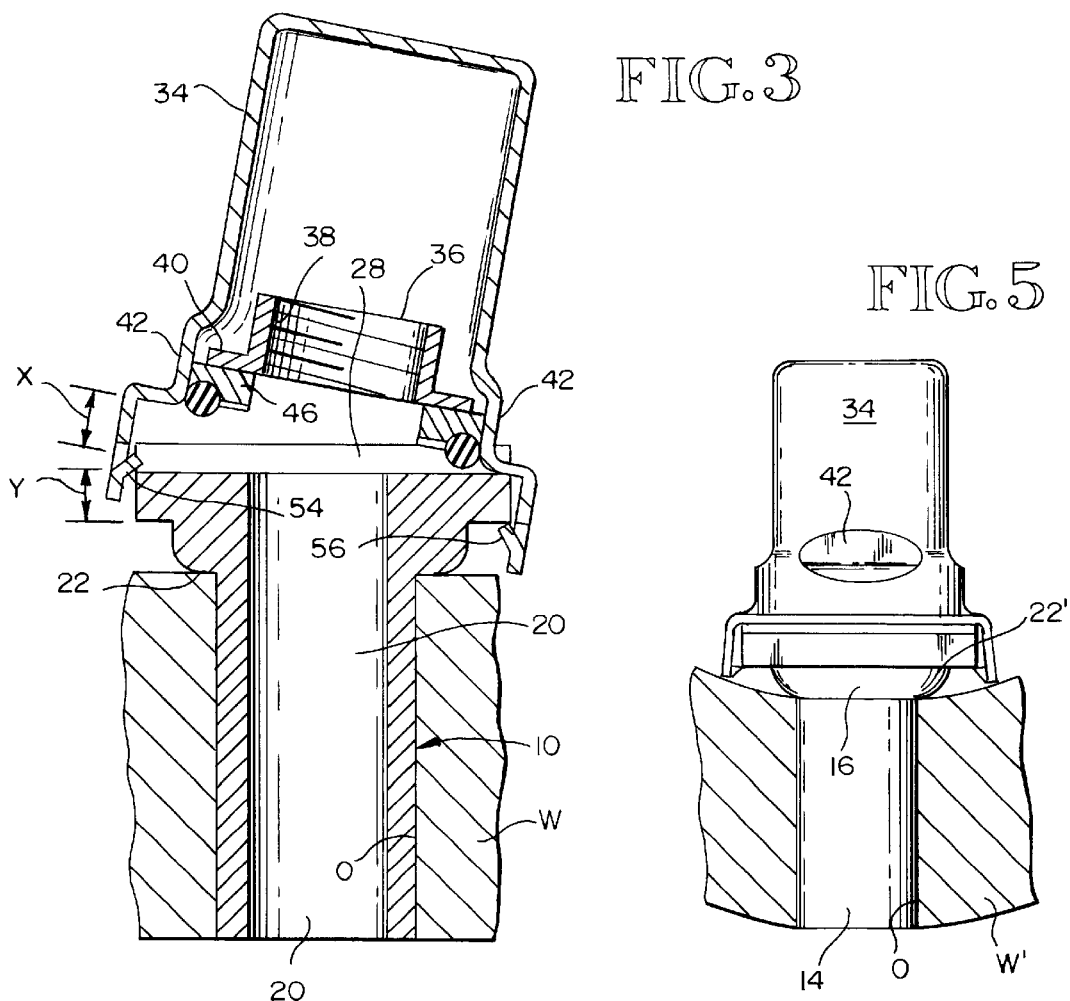
FIG. 3 is a longitudinal sectional view taken substantially along 3—3 of FIG. 4, such view showing the clip-on nut in the process of being installed onto the nut receptor portion of the nut mount.
FIG. 4 is a top plan view of the assembly shown by FIG. 1.
FIG. 5 is a view similar to FIG. 1, but showing the tubular neck of the nut mount within a circular opening in a wall, and further showing the wall presenting a concave surface towards the collar and the collar having a convex surface that contacts the concave surface of the wall.

The nut mount is basically characterized by a tubular stem 14, an annular collar 16 and a nut receptor 18. As best shown by FIG. 3, the tubular stem 14 has an outside diameter that is sized for a close-fit within an opening O in a wall W. Tubular stem 14 includes a center passageway 20 having an inside diameter. Center passageway 20 extends entirely through the nut mount 10. The nut receptor end of passageway 20 is shown in FIG. 2. Both ends of passageway 20 are show in FIG. 3.

The collar 16 is annular and it surrounds the end of the stem 14 that trails the stem 14 into the opening O. Collar 16 includes an end surface 22. As shown by FIG. 3, this end surface 22 makes abutting contact with the wall W where wall W immediately surrounds the opening O. The nut receptor is in the nature of a machined end piece that is endwise outwardly of the collar 16. The nut receptor 18 has a nut-element receiving base 24. Base 24 is flanked by a pair of radial flanges 26, 28. These flanges 26, 28 are nut-element retaining flanges. They hold the nut-element against sideways movement. As best shown by FIG. 2, flanges 26, 28 project axially from edge portions of the base 24. Diametrically opposite edge portions 30, 32 of the base 24 occupy regions between the flanges 26, 28.

In the preferred embodiment, the clip-on nut 12 is a sealed nut. It comprises a sealed housing 34 which forms a nut-element retainer. A nut-element 36 is positioned within the retainer 34. Nut-element 36 is tubular and it is internally threaded at 38. On its exterior it includes four flats 40 spaced about its circumference. Housing 34 includes four flats 42, one for each flat 40. When nut-element 36 is within housing 34, it is free to float radially a limited amount, determined by the flats 40, 42. The flats 42 engage the flats 40 and hold the nut-element 30 against rotation when a bolt (not shown) is being screwed into or out from the nut-element 36. FIG. 3 shows nut-element 36 within housing 34. It also shows an annular closure ring 46 that fits into the housing 34 below the nut-element 36. Closure ring 46 carries an annular seal ring 48 of conventional construction. Seal ring 48 is constructed from any one of a number of well-known elastomeric seal materials. The portions of nut-element retainer 34 immediately above and extending about the nut-element 36 and the closure ring 46 together constitute elements that allow the nut-element to float in position radially a limited amount relative to the nut-element retainer 34.

According to the invention, the nut-element retainer is provided with a pair of diametrically opposite side clips 50, 52. These clips 50, 52 include tabs 54, 56 which are formed by making a three-sided cut in the clips 50, 52, to form the tabs 54, 56. Following the cutting, the tabs 54, 56 are bent inwardly, as shown in FIG. 3. There is a distance X measured between the seal ring 48, when it is relaxed, and the ends of the tabs 54, 56. Dimension X is smaller than dimension Y. Dimension Y is the distance between the base surface 24 and the underneath surface of the base 18. As should be apparent from FIG. 3, the clip-on nut is installed onto the nut receptor of the nut mount, by a pushing motion. This motion may also be described as a snap-on or clip-on motion. The snap-on nut assembly is oriented to place the side clips 50, 52 in alignment with the edge portions 30, 32. Then, the snap-on nut assembly is pushed axially to move the seal member 48 into engagement with the base surface 34. This causes the seal member 48 to compress. It also causes the tabs 54, 56 to want to straighten as they move. When the ends of the tabs 54, 56 are underneath the edge portions 30, 32 of the net receptor, the tabs 54, 56 will spring or snap into place below the underneath surfaces of the edge portions 30, 32. In this position, the tabs 54, 56 will securely lock the snap-on nut onto the nut mount. Owing to the differences between the dimensions X and Y, the seal member 48 will be compressed when the tabs 54, 56 are underneath the edge portions 30, 32. Because it is compressed, seal member 48 will provide a liquid tight seal between ring 46 and base surface 24. This seal will exist even when there is no bolt within the nut mount assembly. The tabs 54, 56 may also be referred to as "catches." They are a preferred form of "catch."

In preferred form, the nut mount 10 is installed in the manner disclosed in the aforementioned U.S. Pat. No. 5,096, 349. As shown by FIG. 10 of that patent, a drill is used to form the opening O in the wall W. Then, the tubular stem portion 14 of nut mount 10 is inserted into the opening O. See FIG. 11 of U.S. Pat. No. 5,096,349. Next, a split sleeve is placed onto a mandrel that projects outwardly from the end of a pulling tool. The sleeve is moved onto the small diameter portion of the mandrel. See FIG. 12 of U.S. Pat. No. 5,096,349. Then, the mandrel and sleeve are moved endwise into the passageway 20, from the end of the nut mount opposite the nut receptor. See FIG. 13 of U.S. Pat. No. 5,096,349. The nosepiece of the pulling tool is then moved into contact with the end of the tubular sleeve 34. See FIG. 14 of U.S. Pat. No. 5,096,349. Then, the pulling tool is operated to pull the mandrel through the split sleeve. As the mandrel moves through the split sleeve, it exerts a radially outwardly force on the split sleeve. This exerts a radially outwardly force on the tubular stem 14, causing stem 14 to expand radially into tight engagement with the side wall of the opening O. It also cold expands the wall material surrounding the opening for fatigue life enhancement.

After nut mount 10 is connected to the wall W, the clip-on nut is installed onto the nut receptor. This is done in the manner described above. It involves merely a simple push-on movement of the clip-on nut 12. After the clip-on nut 12 is installed, the nut mount assembly is ready to receive a bolt. See for example FIG. 3 in U.S. Pat. No. 5,096,349. As previously described, the nut-element 36 is free to float radially somewhat within the housing 34. The relationship of the nut-element 36 to the housing 34, and the flats 40 to the flats 42, permit 360° of radial float. This float allows the nut-element 36 to move an amount sufficient to permit alignment of the threads on the bolt (not shown) with the threads 38 in the nut-element 36. Following initial engagement of the threads, the flats 40 will engage the flats 42 and in this manner the nut-element 36 will be held against rotation, so that the bolt (not shown) can be threaded into the nut-element 36 and tightened, with the nut-element 36 being held against rotation in the process.

FIG. 5 shows a slightly modified construction of the nut mount. In this embodiment, the annular collar or spacer 16' has a convex end surface 22'. By way of example, the end surface 22' may be of spherical curvature, or close to it. This feature allows tight placement of the collar 16' against a concave inner surface 44' of the wall W'. This allows placement of a wall nut inside of a cylindrical member, for example.

FIGS. 6–10 disclose a more conventional wall nut, adapted to be installed in accordance with the present invention. The nut mount construction need not change in substance. For that reason, the nut mount will not be again illustrated or described. In this embodiment, the clip-on nut 58 is composed of a nut-element retainer 60 and a nut-element 62. Nut-element retainer 60 has a flat base wall 62, a pair of attachment clips 64, 66, nut-element retainer tabs 68, 70, 72, 74, 76, 78 and clip-on tabs 80, 82. The base 62 and all of the tabs 68, 70, 72, 74, 76, 78, 80, 82 are all formed from a single piece of sheet metal. As clearly shown by FIGS. 6 and 8–10, the tabs 68, 70, 72, 74 are bent over the corner portions of a base portion 84 of a nut-element 86. Nut-element 86 is composed of the base portion 84 and a tubular portion 88. Tubular portion 88 includes internal threads 90. The tabs 68, 70, 72, 74 permit a limited amount of sideways movement of the nut-element 86 and at the same time restrain it against more than a limited amount of sideways movement. Tabs 76, 78 are positioned to permit some endwise movement of the nut-element 86, but also restrict the movement to a limited amount of movement. Together the tabs or elements 68, 70, 72, 74, 76, 78 allow a limited amount of floating movement of the nut-element 86. This is done for alignment purposes. It permits enough movement of the nut-element 86 so that the internal threads 90 can be mated with external threads on a bolt (not shown). Then, while the bolt is being tightened, the tabs 68, 70, 72, 74, 76, 78 cooperate to hold the nut-element 86 against rotation relative to the nut-element retainer 58. FIG. 8 shows the nut-element 86 in a substantially centered position. When in this position, the threaded opening in the tubular portion 88 is in alignment with an opening 92 in the base wall 62 of the nut retainer 58. FIG. 9 shows an endwise movement of the nut-element 86 within the nut-element retainer 56. FIG. 10 shows a sideways movement of the nut-element 86 within the nut-element retainer 56.

Turning to FIG. 7, the distance Z, measured between the ends of the tabs 80, 82 and the lower surface of the base 62, is substantially equal to the dimension Y. In other words, dimension Z is substantially equal to the thickness of the edge portions 30, 32 of the nut mount.

The clip-on nut shown by FIGS. 6–10 is installed onto the nut mount in essentially the same way that the sealed clip-on nut 12 is installed on the nut mount. The nut mount has side flanges or an equivalent structure on the two sides of the clip-on nut. The clips 64, 66 are located within channel spaces formed between the flanges or equivalent structure. The tabs 80, 82 are set down against the upper edges of the edge portions 30, 32. Then, the clip-on nut is pushed endwise, to cause the tabs 80, 82 to snap past the edge portions 30, 32, until they are below the edge portions 30, 32. When this happens, the tabs 80, 82 act to firmly connect the clip-on nut onto the nut mount.

The embodiment shown by FIGS. 11–13 comprises a nut-element 96, a nut retainer 98 and a nut mount 100. The nut-element 96 includes a flat base 102 and a tubular body 104 that is connected to the base 102 and projects upwardly from the base 102. Tubular body 104 is internally threaded at 106. Base 102 includes a pair of radially opposite projections 108, 110. Nut retainer 98 is preferably pressed formed out of sheet metal into the shape shown. It includes a pair of diametrically opposite side portions 112, 114, a flat, generally annular central portion 116, and four clips 118, 120, 122, 124. Clips 120 and 124 are planer. Clips 118, 122 are generally planer but include tabs 126, 128 that are like the previously described tabs 52, 54 and 80, 82. Nut mount 100 has a tubular body 130, an annular collar 132 that is like collar 16 or 16', and a generally square top 134. A central passageway 136 extends axially through the nut mount 100. Nut mount 100 is installed within an opening O in a workpiece in one of the above-described ways. Preferably, it is "expanded" to secure it within the opening O in the workpiece W. The nut-element 96 and the nut retainer are assembled in the following manner. One of the projections, e.g. projection 108, is set into one of the sidewall openings 138, 140. For example, let us assume that it is inserted into opening 138. The opposite projection 110 is set at an angle on side portion 112. Then, nut-element 96 is pushed downwardly to snap-fit projection 110 within opening 140. When this happens, the base 102 is sitting on the flat central portion 116. Engagement of the projections 108, 110 within the openings 138, 140 allows a sufficient amount of float of the nut element 96 relative to the nut retainer 98 to facilitate alignment of the threads 106 with the threads of a bolt. Engagement of projections 108, 110 within the openings 138, 140 also holds the nut-element 96 against rotation relative to the nut retainer 98.

When assembled, the nut-element 96 and the nut retainer 98 are snap-fitted onto the head 134 of the nut mount 100. This is done by placing the nut-element and nut mount assembly over the square end 134 of the nut mount 100, with the four clips 118, 120, 122, 124 generally aligned with the outer edge surfaces of the head 134. Then, the assembly is moved downwardly. The clips 118, 122 and tabs 126, 128 move a sufficient amount so that the tabs 126, 128 are moved past edge portions of the head 134. When this happens, the tabs 126, 128 snap-fit under the edge portions of the top 134. The tabs 126, 128 move under the opposite edge portions of the top 134. This is shown by FIG. 13. Note the position of the tabs 126, 128. This positioning of the tabs 126, 128 below the opposite edge portions of the head 134 locks the nut-element 96 and nut retainer 98 onto the nut mount 100. The positioning of the clips 118, 120, 122, 124 prevent sidewise movement and rotation of the assembly 96, 98 relative to the nut mount 100.

FIG. 14 shows a bolt-element 142 that can be used in the assembly of FIG. 11 in place of the nut element 96. Bolt-element 142 has a base portion 144 that is like base portion 102 of nut-element 96. It includes a pair of projections 146, 148 that may be identical to projections 108, 110. The bolt-element 142 includes a threaded bolt shank 150 that is in some suitable manner attached to the central portion of base 144. For example, shank 150 may include a flat head 152 that is securely fastened to base 144. In FIG. 14, threaded shank 150 is shown to have a diameter that is substantially smaller than the inside diameter of the tubular body 130 of the wall mount 100. This enables the use of an elongated tubular nut that has an outside diameter sized to allow it to fit within the passageway 136. This nut element would have a head (not shown) that is attached to one end of the tubular body. The wall mount element 100 is secured to a wall or workpiece. The bolt-element 142 is secured to the retainer 98. The retainer 98 is clipped onto the head 134 of the mount 100. Then, the tubular body of the nut-element (not shown) is moved through an opening in some member that is going to be attached to the wall or workpiece, and is threaded onto the bolt 150. It is tightened onto bolt 150 until its head is tight against the member that is being attached to the wall or workpiece W. In another embodiment, the threaded bolt shank can be made substantially equal in diameter to the opening 136 but long enough so that it will project through and beyond an opening in the member that is going to be attached to the wall or workpiece W. This is so that there will be a projecting end portion of the bolt-element that can receive a nut. The projecting end portion projects outwardly away from the member that is being attached to the wall or workpiece W. The nut is then screwed onto the projecting end portion of the bolt.

It is to be understood that the illustrated embodiments, while preferred, are merely examples of the invention. Substantial changes can be made in the form of the several components of the wall nut assembly without departing from the invention. For example, the lower portion of the nut-element retainer can have a downwardly opening annular groove that receives the flanges 26, 28. This engagement of the flanges 26, 28 within the groove takes the place of the nut-element retainer base being trapped within the confines of the flanges 26, 28.

It is within the scope of the invention to secure the nut mount within a wall opening by means other than cold expansion. For example, the opening in the wall can be threaded and matching threads can be placed on the stem enabling the stem to be screwed into the threaded opening. Or, the stem could be made longer than the opening into which it is inserted so that it has an end portion which projects out from the opening on the backside of the wall. Following insertion of the stem in the wall opening, the projecting end portion can be flared or crimped to in that manner connect the nut mount to the wall. Or, the nut cage can be secured to the wall by means other than the use of a stem within the fastener opening. Also, the nut mount of the invention can be used in a wide variety of wall members and materials. It can be used in metal members, composites and various structural plastics.

It is to be understood that many variations in size, shape and construction can be made to be illustrated in the above-described embodiments of the nut mount without departing from the spirit and scope of the present invention. Some of the features of the preferred embodiment may be utilized without other features. Therefore, it is to be understood that the described and illustrated embodiments are non-limitive and are for example purposes only. The scope of the invention is not to be determined by the disclosed features of the disclosed embodiments but rather only by the following claims construed in accordance with the accepted rules of patent claim construction, including use of the doctrine of equivalents.

What is claimed is:

1. A nut mount that is connectable to a wall by use of a single circular stem opening in said wall, and is adapted for reception of a clip-on nut having side clips, said nut mount comprising:

a tubular stem having an outside diameter sized for close-fit insertion into said circular stem opening in said wall, and an inside diameter;

a collar at one end of said stem that is larger in diameter than said stem, said collar having an end surface positioned to contact said wall, about said opening in said wall, when the stem is within said stem opening in said wall; and a nut receptor positioned endwise of the collar, opposite the stem, said nut receptor having a nut receiving base spaced axially from said end surface of said collar, said base having diametrically opposite edge portions that project radially outwardly from and radially overhang said collar, said edge portions being positioned to be spaced axially away from said wall when the stem is within said stem opening in said wall and the end surface of the collar is in contact with said wall about said stem opening in said wall, said nut receptor having an open axial avenue into said nut receiving base on the side of the base opposite the stem;

whereby following connection of the nut mount to said wall, with said stem positioned within said stem opening in said wall, and the end surface of the collar contacting said wall, a said clip-on nut having side clips can be moved axially onto the nut receiving base of said nut receptor and by said clips be clipped onto said edge portions of said nut receptor.

2. A nut mount according to claim 1, comprising:

a pair of spaced apart nut retaining flanges on the nut receiving base, said flanges projecting axially from edge portions of the base, in a direction opposite the stem, whereby a said clip-on nut can be placed on the nut receiving base between said flanges.

3. A nut mount according to claim 2 wherein said end surface of said collar is convex, enabling said end surface to be positioned against a concave wall surface.

4. A nut mount according to claim 1, wherein said end surface of said collar is convex, enabling said end surface to be positioned against a concave wall surface.

5. A clip-on nut, for use with a nut receptor having diametrically opposite edge portions, said clip-on nut comprising:

a nut-element retainer having a base with a bottom and a pair of side clips extending axially downwardly from the bottom of the base at diametrically opposite locations on said retainer, each said side clip including a radially inwardly projecting catch, said catches being spaced axially a predetermined distance below said base; and a nut-element on said nut-element retainer above said base, said nut-element being secured to the nut-element retainer by elements allowing the nut-element to float in position radially a limited amount relative to the nut-element retainer, whereby the clip-on nut can be placed onto a said nut receptor and be clipped onto the diametrically opposite edge portions of the nut receptor, with the catches engaging underneath portions of said edge portions of the receptor.

6. A clip-on nut according to claim 5, wherein the nut retainer includes a sealed housing that extends axially from the base, in a direction opposite from the side clips, and said nut-element is within said sealed housing, and said base includes an annular seal disposed on the underneath side of the base, between the two side clips.

7. A clip-on nut according to claim 5, wherein the nut-element includes a base and an internally threaded tubular portion projecting upwardly from said base, and wherein said nut-element retainer includes retainer elements which engage the nut-element and secure it to the nut-element retainer in a manner allowing it to float in position radially a limited amount.

8. A clip-on nut according to claim 7, wherein the side clips are downwardly turned flange portions of the base of the nut-element retainer, and said catches are inwardly bent portions of said flange portions.

9. A clip-on nut according to claim 5, wherein the side clips are downwardly bent flange portions of the base of the nut-element retainer.

10. A clip-on nut according to claim 9, wherein the catches are inwardly turned portions of said flange portions of the base of the nut-element.

11. A wall nut assembly, comprising:
a nut mount that is connectable to a wall by use of a single circular opening in the wall, said nut mount comprising:
a tubular stem having a first end, a second end, an outside diameter sized for close-fit insertion into the circular opening in the wall, and an inside diameter:
a collar at said first end of said stem, said collar having an end surface positioned to be in contact with the wall, about the opening in the wall, when the stem is within the opening in the wall, said stem extending axially from said end surface of said collar to said second end of said stem;
a nut receptor on said nut mount, endwise outwardly of the collar, said nut receptor having a base, said base having diametrically opposite edge portions that project radially outwardly from and radially overhang said collar, said edge portions being positioned to be spaced axially outwardly from the wall when the stem is within said opening in the wall and the end surface of the collar is in contact with the wall about the opening in the wall; and
a clip-on nut, comprising:
a nut-element retainer having a base and a pair of side clips extending axially downwardly from the base at diametrically opposite locations on said retainer, each said side clip including a radially inwardly projecting catch, said catches being spaced axially from said base a distance substantially equal to the thickness of the nut receiving base of the nut receptor on the nut mount; and
a nut-element on said nut-element retainer, said nut-element being secured to the nut-element retainer but allowed to float in position radially a limited amount,
whereby the nut mount may be connected to a wall, with the tubular stem within a circular opening in the wall and the end surface of the collar in contact with the wall, and the clip-on nut can be placed onto the nut receptor and be clipped onto the diametrically opposite edge portions of the nut receptor, with the catches on the side clips of the nut-element retainer engaging underneath portions of said edge portions of the receptor, for holding the clip-on nut onto the nut mount.

12. A wall nut assembly according to claim 11, wherein the nut mount includes nut retaining flanges on the nut receiving base, said flanges projecting axially from edge portions of the base, in a direction opposite the stem, whereby the clip-on nut can be placed on the nut receiving base between said flanges.

13. A wall nut assembly according to claim 11, wherein said end surface on said collar is convex, enabling said end surface to be positioned against a concave wall surface.

14. A wall nut assembly according to claim 11, wherein the nut retainer includes a sealed housing that extends axially from the nut retainer base, in a direction opposite from the side clips, and said nut-element is within said housing, and said nut retainer base includes an annular seal disposed on the underneath side of said base, between the two side clips.

15. A wall nut assembly according to claim 11, wherein the nut-element includes a base and an internally threaded tubular portion projecting upwardly from said nut-element base, and wherein said nut-element retainer includes retainer elements which engage the nut-element and secure it to the nut-element retainer in a manner allowing it to float in a position radially a limited amount.

16. A wall nut assembly according to claim 11, wherein the side clips are downwardly turned flange portions of the base of the nut-element retainer, and said catches are inwardly bent portions of said flange portions.

17. A wall nut assembly according to claim 11, wherein the side clips are downwardly bent flange portions of the base of the nut-element retainer.

18. A wall nut assembly according to claim 17, wherein the catches are inwardly turned portions of said flange portions.

19. In combination:
A wall including a circular opening;
a nut mount that is connected to the wall by use of said circular opening in the wall, said nut mount comprising:
a tubular stem having an outside diameter sized for close-fit insertion into the circular opening in the wall, and an inside diameter, said tubular stem being positioned in said circular opening in the wall, and being secured to the wall;
a collar at one end of said stem, said collar having an end surface in contact with the wall, about the opening in the wall; and
a nut receptor endwise outwardly of the collar, said nut receptor having a nut receiving base, said nut receiving base having diametrically opposite edge portions that project radially outwardly from and radially overhang said collar, said edge portions being spaced axially away from said wall; and
a clip-on nut, comprising:
a nut-element retainer having a base with a bottom and a pair of side clips extending axially downwardly from the bottom of the base at diametrically opposite locations on said retainer, each said side clip including a radially inwardly projecting catch, said catches being spaced axially a predetermined distance from said base; and
a nut-element on said nut-element retainer, said nut-element being secured to the nut-element retainer by elements allowing the nut-element to float in position radially a limited amount relative to the nut-element retainer,
whereby the nut mount is connected to the wall, with its tubular stem within the circular opening in the wall, and then the clip-on nut is placed onto the nut receptor and is clipped onto the nut mount by means of the catches on the side clips engaging underneath portions of the opposite edge portions of the receptor.

20. A combination of claim 19, wherein the nut receiving base of the nut mount includes nut retaining flanges on the nut receiving base, said flanges projecting axially from edge portions of the base, in a direction opposite the stem, whereby the clip-on nut is placed on the nut receiving base between said flanges.

21. The combination of claim 19, wherein said wall has a convex surface directed toward the nut mount, and the end surface of the collar is convex where it contacts the concave surface of the wall.

22. The combination of claim 19, wherein the nut retainer includes a sealed housing that extends axially from the nut retainer base, in a direction opposite from said side clips, and said nut-element is within said sealed housing, and said nut retainer base includes an annular seal disposed on the underneath side of said base, between the two side clips.

23. The combination of claim 19, wherein the nut-element includes a nut-element base and an internally threaded tubular portion projecting upwardly from said nut-element base, and wherein said nut-element retainer includes retainer elements which engage the nut-element and secure it to the nut-element retainer in a manner allowing it to float in position radially a limited amount.

24. The combination of claim 23, wherein the side clips are downwardly turned flange portions of the base of the nut-element retainer, and said catches are inwardly bent portions of said flange portions.

25. The combination of claim 19, wherein the side clips are downwardly bent flange portions of the base of the nut-element retainer.

26. The combination of claim 25, wherein the catches are inwardly turned portions of said flange portions of the base of the nut-element retainer.

27. A bolt mount that is connectable to a wall by use of a single circular stem opening in the wall, said bolt mount comprising:
   a tubular stem having an outside diameter sized for close-fit insertion into said circular stem opening in said wall, and an inside diameter;
   a collar at one end of said stem that is larger in diameter than said stem, said collar having an end surface positioned to be in contact with said wall, about said stem opening in said wall, when the stem is within said stem opening in said wall; and
   a bolt receptor endwise outwardly of the collar, said bolt receptor having a bolt receiving base, said base having diametrically opposite side edge portions that project radially outwardly from and radially overhang said collar, said edge portions being positioned to be spaced axially away from said wall when the stem is within said opening in said wall and the end surface of the collar is in contact with said wall about the opening in said wall,
   whereby following connection of the bolt mount to the wall, with said stem positioned within said stem opening of said wall, a clip-on bolt having side clips can be placed on the bolt receiving base of said bolt receptor and by said clips be clipped onto said edge portions of said bolt receptor.

28. A bolt mount according to claim 27, wherein the bolt receptor is substantially square, has a flat end surface and four edge surfaces, and a central opening of the same diameter as the inside diameter of the tubular stem.

29. A clip-on bolt, comprising:
   a bolt-element retainer having a base and a pair of side clips extending axially downwardly from the base at diametrically opposite locations on said retainer, each said side clip including a radially inwardly projecting catch, said catches being spaced axially a predetermined distance from said base; and
   a bolt-element on said bolt-element retainer, said bolt-element being secured to the bolt-element retainer but allowed to float in position radially a limited amount,
   whereby the clip-on bolt can be placed onto a bolt receptor and be clipped onto diametrically opposite edge portions of the bolt receptor, with the catches engaging underneath portions of said edge portions of the receptor.

30. A wall bolt assembly, comprising:
   a bolt mount that is connectable to a wall by use of a single circular opening in the wall, said bolt mount comprising:
      a tubular stem having an outside diameter sized for close fit insertion into the circular opening in the wall, and an inside diameter;
      a collar at one end of said stem, said collar having an end surface positioned to be in contact with the wall, about the opening in the wall, when the stem is within the opening in the wall;
      a bolt receptor on said bolt mount, endwise outwardly of the collar, said bolt receptor having a base, said base having diametrically opposite side portions that radially overhang said collar, said edge portions being positioned to be spaced axially outwardly from the wall when the stem is within said opening in the wall and the end surface of the collar is in contact with the wall about the opening in the wall; and
   a clip-on bolt, comprising:
      a bolt-element retainer having a base and a pair of side clips extending axially downwardly from the base at diametrically opposite locations on said retainer, each said side clip including a radially inwardly projecting catch, said catches being spaced axially from said base a distance substantially equal to the thickness of the bolt receiving base of the bolt receptor on the bolt mount; and
      a bolt-element on said bolt-element retainer, said bolt-element being secured to the bolt-element retainer but allowed to float in position radially a limited amount, said bolt-element having a threaded bolt shank that extends from the bolt receptor into the tubular stem,
      whereby the bolt mount may be connected to a wall, with the tubular stem within a circular opening in the wall, and the clip-on bolt can be placed onto the bolt receptor and be clipped onto the diametrically opposite edge portions of the bolt receptor, with the catches engaging underneath portions of said edge portions of the receptor, for holding the clip-on bolt onto the bolt mount, with the threaded bolt shank located within the tubular stem.

31. A fastener mount that is connectable to a wall by use of a single circular opening in the wall, said fastener mount comprising:
   a tubular stem having an outside diameter sized for close-fit insertion into the circular opening in the wall, and an inside diameter;
   a collar at one end of said stem that is larger in diameter that said stem, said collar having an end surface positioned to be in contact with the wall, about the opening in the wall, when the stem is within the opening in the wall; and
   a fastener receptor positioned endwise of the collar, opposite the stem, said fastener receptor having a fastener receiving base spaced axially from said end surface of said collar, said base having diametrically opposite edge portions that project radially outwardly, from and radially overhang said collar, said edge portions being positioned to be spaced axially away from the wall when the stem is within said opening in the wall and the end surface of the collar is in contact with the wall about the opening in the wall, said fastener receptor having an open axial avenue in to said fastener receiving base on the side of the base opposite the stem, whereby following connection of the fastener mount to the wall, with the stem positioned within the opening in the wall, and the end surface of the collar contacting said wall, a clip-on fastener having side clips can be moved axially onto the fastener receiving base of said fastener receptor and by said clips be clipped onto said edge portions of said fastener receptor.

32. For use with a fastener element receptor having a base, a pair of diametrically opposite edge portions, and an open axial avenue in to said base, a clip-on fastener-element comprising:

a fastener-element retainer having a base with a bottom and a pair of side clips extending axially downwardly from the bottom of the base at diametrically opposite locations on said retainer, each said side clip including a radically inwardly projecting catch, said catches being spaced axially a predetermined distance from said base; and a fastener-element on said fastener-element retainer, said fastener-element being secured to the fastener-element retainer by elements allowing the fastener-element to float in position radially a limited amount relative to the fastener-element retainer, whereby a fastener-element can be placed onto a fastener-element receptor and be moved axially onto the base of said fastener receptor, clips first, and be clipped onto diametrically opposite edge portions of the fastener-element receptor, with the catches engaging underneath portions of said edge portions of the receptor.

33. A fastener-element wall mount assembly, comprising:

a fastener-element mount that is connected to a wall by use of a single circular stem opening in the wall, said fastener-element mount comprising:

a tubular stem having an outside diameter sized for close-fit insertion into said circular stem opening in said wall, and an inside opening;

a collar at one end of said stem, said collar having an end surface positioned to be in contact with said wall, about said stem opening in said wall, when said stem is within said stem opening in said wall;

a fastener-element receptor endwise outwardly of the collar, said fastener-element receptor having a base, said base having diametrically opposite edge portions that project radially outwardly from and radially overhang said collar, said edge portions being positioned to be spaced axially outwardly from said wall when the stem is within said stem opening in said wall and the end surface of the collar is in contact with said wall about the stem opening in said wall; and a clip-on fastener-element, comprising:

a fastener-element retainer having a base with a bottom and a pair of side clips extending axially downwardly from the bottom of the base at diametrically opposite locations on said retainer, each said side clip including a radially inwardly projecting catch, said catches being spaced axially from said base a distance substantially equal to the thickness of said fastener-element receiving base of said fastener-element receptor; and a fastener-element receptor on the fastener-element mount; and a fastener-element on said fastener-element retainer, said fastener-element being secured to the fastener-element retainer by elements allowing the fastener-element to float in position radially a limited relative to the fastener-element retainer, whereby said fastener-element mount may be connected to a wall with said tubular stem within a circular stem opening in said wall, and said clip-on fastener-element can be placed onto said fastener-element receptor and be clipped onto said diametrically opposite edge portions of the fastener-element receptor, with said catches engaging underneath portions of said edge portions of the fastener-element receptor, for holding said clip-on nut onto said fastener-element mount.

* * * * *